United States Patent [19]

Blumentritt et al.

[11] Patent Number: 4,933,945
[45] Date of Patent: Jun. 12, 1990

[54] ARRANGEMENT FOR CONVERTING THE FREQUENCY OF A LASER BEAM

[75] Inventors: Martin Blumentritt, Königsbronn; Peter Greve, Essingen; Wolfgang Rupp, Aalen, all of Fed. Rep. of Germany

[73] Assignee: Carl-Zeiss-Stiftung, Heidenheim/Brenz, Fed. Rep. of Germany

[21] Appl. No.: 408,543

[22] Filed: Sep. 18, 1989

[30] Foreign Application Priority Data

Sep. 19, 1988 [DE] Fed. Rep. of Germany ....... 3831758
Apr. 28, 1989 [DE] Fed. Rep. of Germany ....... 3914070

[51] Int. Cl.$^5$ .............................................. H01S 3/10
[52] U.S. Cl. ........................................ 372/28; 372/22; 372/98; 372/12; 372/13; 372/9; 372/103
[58] Field of Search .................... 372/28, 26, 9, 103, 372/33, 22, 12, 13, 108, 93, 92, 98

[56] References Cited

U.S. PATENT DOCUMENTS

| | | | |
|---|---|---|---|
| 3,697,181 | 10/1972 | Macek et al. | 372/26 |
| 3,904,983 | 9/1975 | Moreno et al. | 372/103 |
| 4,287,486 | 9/1981 | Javan | 372/103 |
| 4,514,849 | 4/1985 | Witt et al. | 372/26 |
| 4,618,957 | 10/1986 | Liu | 372/22 |
| 4,675,500 | 6/1987 | Kunz et al. | 372/103 |
| 4,783,787 | 11/1988 | Doi et al. | 372/26 |

FOREIGN PATENT DOCUMENTS

| | | | |
|---|---|---|---|
| 0160188 | 8/1985 | Japan | 372/103 |
| 0160189 | 8/1985 | Japan | 372/103 |

Primary Examiner—Léon Scott, Jr.
Attorney, Agent, or Firm—Walter Ottesen

[57] ABSTRACT

The invention is directed to a laser arrangement for converting frequency wherein the fundamental frequency or the converted frequency can be selectively emitted by means of an optical element which can be pivoted into and out of the beam path. An especially slim configuration of the overall arrangement is obtained with the aid of an additional deflection element.

10 Claims, 3 Drawing Sheets

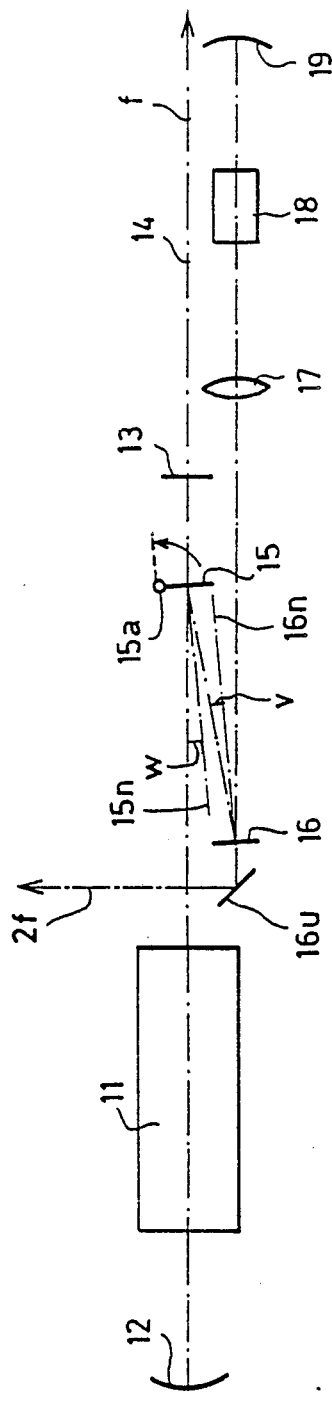
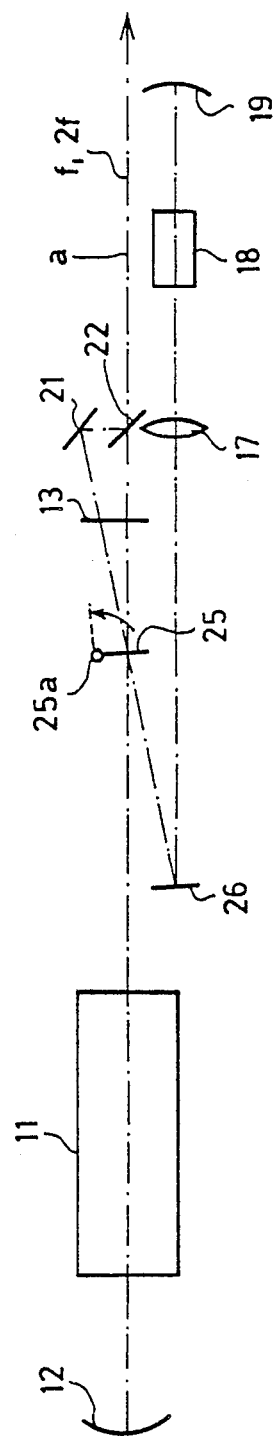
Fig.1
Fig.2

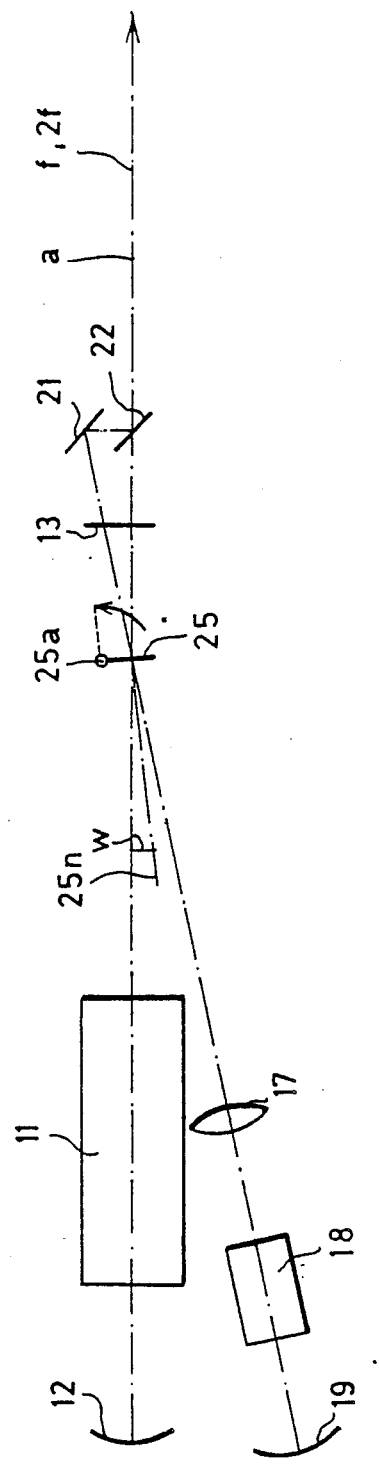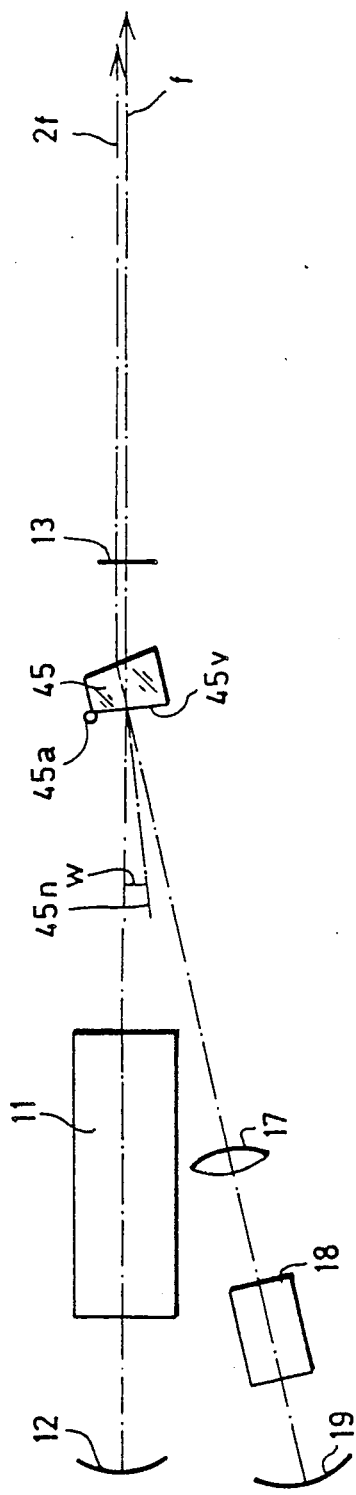

ARRANGEMENT FOR CONVERTING THE FREQUENCY OF A LASER BEAM

FIELD OF THE INVENTION

The invention relates to an arrangement for converting the frequency of a laser beam with a nonlinear element disposed within a resonator. The beam path in the resonator is deflected by means of an optical element.

BACKGROUND OF THE INVENTION

The frequency of a laser can be converted, for example, doubled, with a nonlinear element. U.S. Pat. No. 4,618,957 discloses a laser arrangement wherein a nonlinear crystal is mounted in the resonator for doubling frequency. The resonator has a deflected beam path with the mirror at the deflection location operating to couple out the beam having the doubled frequency.

This known arrangement has the disadvantage that it only emits radiation having the doubled frequency. Furthermore, this known arrangement requires a relatively large mounting area because of the deflected beam path.

In addition to a doubling of frequency, other conversions can be carried out with nonlinear elements, such as a tripling of frequency or a Raman conversion.

SUMMARY OF THE INVENTION

It is an object of the invention to provide a laser arrangement which enables the fundamental frequency or the converted frequency to be selectively generated and which nonetheless has the most compact configuration.

The laser arrangement of the invention is for converting the frequency of a laser beam. The laser arrangement includes: a laser head for generating a laser beam having a fundamental frequency (f) and travelling along a beam path defining a beam axis; first mirror means arranged on the beam axis; the laser head and the mirror means conjointly defining a resonator; a pivotable optical element defining a normal and being pivotally mounted in the arrangement so as to be pivotable into a first position wherein the pivotable optical element is in the beam path so as to deflect the beam out of said axis and along an altered beam path while at the same time causing the normal to define an acute angle with the beam axis; a nonlinear element disposed in the arrangement so as to be in the altered beam path for operating on the beam when the pivotable optical element is in the first position; second mirror means mounted in the arrangement so as to be on the altered beam path for coacting with the first mirror means to bound the resonator when the pivotable optical element is in the first position; and, the pivotable optical element being mounted so as to be pivotable out of the first position and into a second position wherein the pivotable optical element is clear of the axis so as not to deflect the beam emanating from the laser head.

In an advantageous embodiment of the invention, an additional optical element is provided for again deflecting the beam path in the resonator when the pivotally mounted optical element is in its pivoted-in position. The normal of the additional optical element is likewise arranged at an acute angle to the beam path. In this way, the resonator portion for frequency doubling is parallel to the resonator portion for the fundamental frequency and an especially slim configuration is obtained.

In an especially advantageous embodiment of the invention, optical means are provided which reorientate the axis of the beam having the converted frequency into the axis of the beam with the fundamental frequency. This provides a laser arrangement which emits two different frequencies along the same optical axis by means of an optical element which can be pivoted into and out of the beam path.

The advantage of acute angles for deflecting the beam path is that standard mirrors or layers on optical components can be used which are easily produced or can be produced with better reflectance and transmission properties. Such optical components cannot be used when deflecting at larger angles.

BRIEF DESCRIPTION OF THE DRAWINGS

The invention will now be described with reference to the drawings wherein:

FIG. 1 is an embodiment of the laser arrangement according to the invention wherein the beam having the doubled frequency is emitted in a direction other than that of the beam having the fundamental frequency;

FIGS. 2 and 3 show two embodiments wherein the axis of the beam having the doubled frequency is deflected into the axis of the beam having the fundamental frequency;

DESCRIPTION OF THE PREFERRED EMBODIMENTS OF THE INVENTION

Figure 3:
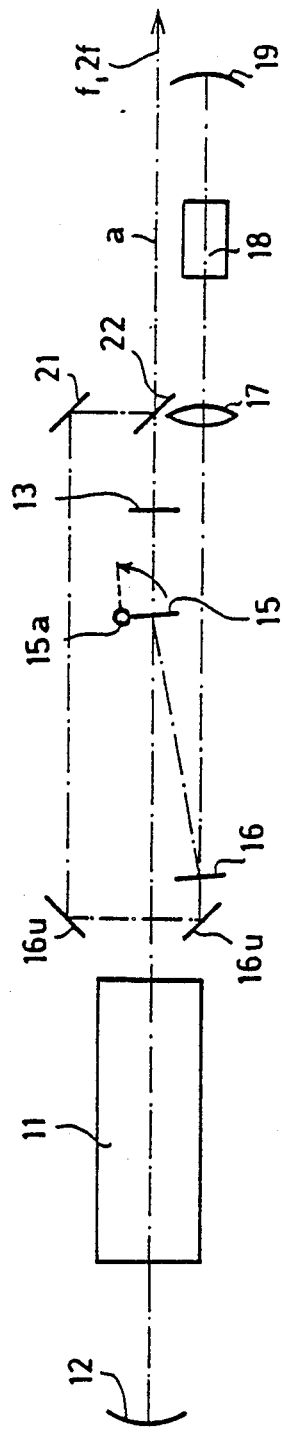

In all of the embodiments shown in FIGS. 1 to 6, the angles (w, v) are shown larger than they would be in actual practical embodiments so that a better view of these angles can be provided.

In FIG. 1, reference numeral 11 identifies a laser head which comprises, for example, a Nd:YAG-crystal having a pump lamp source and a cooling unit. The laser head 11 and the mirrors (12, 13) conjointly define a resonator from which a laser beam 14 exits at the fundamental frequency (f) through the mirror 13. A mirror 15 is mounted within the resonator and is pivotable about axis 15a. In the position shown in phantom outline, the mirror 15 is outside of the beam path and a beam having the fundamental frequency (f) exits from the resonator.

The position of the axis 15a of the mirror 15 and its stop are conjointly so configured that when the mirror is pivoted into the beam path, it will always come into the previously adjusted position.

When the mirror 15 is pivoted into the beam path, the resonator is bounded by the mirrors (12, 19) with the mirrors (15, 16) being utilized as path-folding mirrors. A known frequency-doubling crystal 18 such as a KTP-crystal or another nonlinear element is disposed in the expanded portion of the resonator. The converging lens 17 and the concave mirror 19 conjointly effect an increased efficiency of the frequency doubling in a known manner. The beam having the doubled frequency is coupled out by means of the mirror 16 which has the largest possible transmission for the beam having the doubled frequency. A further mirror 16u deflects the beam having the doubled frequency 2f into the desired direction. The concave mirror 19 has the largest possible reflectance for both frequencies.

The angles of incidence (w, v) at the mirrors (15, 16) to the mirror normals (15n, 16n) are preferably as small as possible, that is, they are acute angles. In this way, a slim configuration of the overall laser arrangement is obtained. Furthermore, standard mirrors can be used for the perpendicular incidence which are easier to produce or can be produced with better reflection and transmission properties than mirrors for large angles of incidence.

In FIG. 2, an embodiment is disclosed wherein the beam having the doubled frequency is deflected precisely into the axis of the beam having the fundamental frequency. For this purpose, the mirror 26 is configured as a pure reflection mirror for both frequencies. The mirror 25 is pivotable about the axis 25a and is configured as an outcoupling mirror for the doubled frequency; that is, this mirror 25 has a transmission as high as possible for the doubled frequency and a reflectance as high as possible for the fundamental frequency.

With the adjustable mirrors (21, 22), the beam with the doubled frequency can be brought precisely into the axis (a) of the beam having the fundamental frequency. Both mirrors (21, 22) have a reflectance as high as possible for the doubled frequency. The mirror 22 additionally has a high transmission for the fundamental frequency.

All of the elements in FIG. 2 having the same reference numerals as those in FIG. 1 are identical with each other. In the embodiment of FIG. 2, the outcoupling mirror 13 for the fundamental frequency must also have the greatest possible transmission for the doubled frequency.

The arrangement shown in FIG. 2 has, for example, the advantage that both frequencies can be easily coupled into one and the same fiber.

FIG. 3 shows another embodiment of the invention for deflecting the beam having the doubled frequency into the axis of the beam having the fundamental frequency. The elements shown in FIG. 3 having the same reference numerals as those in FIGS. 1 and 2 are identical elements. The mirror 15 is pivotable about the axis 15a and functions again as a switchover element between the two frequencies. The doubled frequency is coupled out via the mirror 16 and is deflected precisely into the axis (a) of the beam having the fundamental frequency via the two deflecting mirrors 16u as well as the adjustable mirrors (21, 22).

Figure 4:
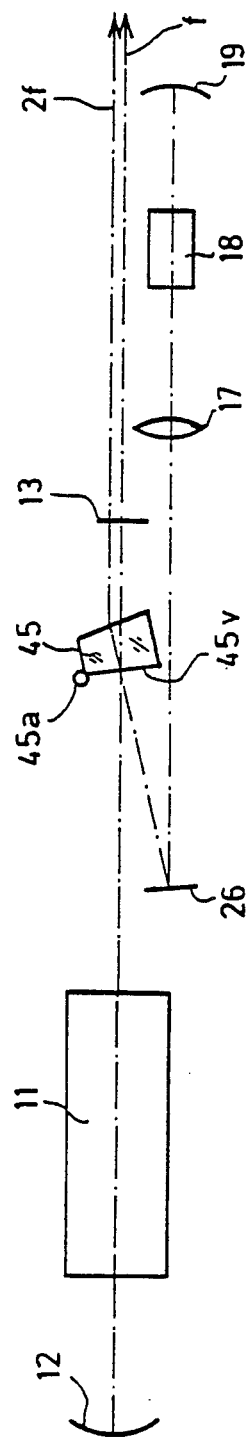
FIG. 4 is an embodiment of the laser arrangement according to the invention which has an especially simple configuration and wherein the beam having the doubled frequency is emitted very closely and parallelly to the beam having the fundamental frequency; and, FIGS. 5 and 6 show two embodiments of the laser arrangement according to the invention wherein only one deflection of the beam path having the doubled frequency occurs in the resonator by means of the optical element which is mounted so as to be pivotable into and out of the beam path.

In FIG. 4, the switchover of the frequencies is performed with the prism 45 which is reproducibly pivoted about axis 45a into the beam path when the doubled frequency is to be emitted. The forward face 45v of the prism is provided with a coating which is highly reflective for the fundamental frequency and is as transmissive as possible for the doubled frequency. The wedge shape of the prism 45 enables the beam having the doubled frequency to exit parallel to the axis of the beam having the fundamental frequency. The slight beam offset between these two axes can, for example, be 1 mm and can be corrected by means of a plane-parallel plate pivotally mounted so as to likewise be pivoted into the beam path of the beam having the doubled frequency.

In FIG. 5, the mirror 25 is pivotable into the beam path and is the same as the mirror used in FIG. 2. However, no additional deflection of the beam path occurs in the resonator; instead, the nonlinear crystal 18, mirror 19 and lens 17 are arranged at the same end of the laser head 11. With a suitable configuration, the angle of incidence (w) at mirror 25 can nonetheless be made sufficiently small, for example, 4°. Likewise, as in the embodiment of FIG. 2, the beam with the doubled frequency is coupled out by the mirror 25 and the mirrors (21, 22) bring this beam precisely into the axis (a) of the beam having the fundamental frequency.

In FIG. 6, the same prism 45 as shown for FIG. 4 is used and is pivotable into the beam path. As in FIG. 4, there is no additional deflection of the beam path. The beam with the double frequency is again deflected by the wedge shape of the prism so as to be parallel to the axis of the beam having the fundamental frequency. Here too, the small beam offset between these two axes can be corrected with a plane-parallel plate pivotable into the beam path for the doubled frequency.

In all of the embodiments shown, the laser head can be a continuous wave laser or a pulsed laser. If a continuous wave laser is used, then the average capacity of converted radiation can be increased by means of an acusto-optical modulator or an electro-optical modulator.

If the frequency is to be tripled or a Raman conversion is to occur, then the embodiments shown in FIGS. 1 to 6 can likewise be used with the only difference that in lieu of the KTP-crystal 18, a known BBO-crystal can be used for tripling the frequency and for the Raman conversion, a known methane gas pressure cell or a known $LiNbO_3$-crystal can be arranged.

It is understood that the foregoing description is that of the preferred embodiments of the invention and that various changes and modifications may be made thereto without departing from the spirit and scope of the invention as defined in the appended claims.

What is claimed is:

1. A laser arrangement for converting the frequency of a laser beam, the laser arrangement comprising:

a laser head for generating a laser beam having a fundamental frequency and travelling along a beam path defining a beam axis;

first mirror means arranged on said beam axis;

said laser head and said mirror means conjointly defining a resonator;

a pivotable optical element defining a normal and being pivotally mounted in said arrangement so as to be pivotable into a first position wherein said optical element is in said beam path so as to deflect said beam out of said axis and along an altered beam path while at the same time causing said normal to define an acute angle with said beam axis;

a nonlinear element disposed in said arrangement so as to be in said altered beam path for operating on said beam when said optical element is in said first position;

second mirror means mounted in said arrangement so as to be on said altered beam path for coacting with said first mirror means to bound said resonator when said optical element is in said first position; and, said optical element being pivotally mounted so as to be pivotable out of said first position and into a second position wherein said optical element is out of said axis so as not to deflect the beam emanating from said laser head.

2. The arrangement of claim 1, comprising an additional optical element defining a normal and being arranged downstream of said pivotable optical element on said altered beam path to again deflect the beam before it passes into said nonlinear element when said pivotable optical element is in said first position; and, said normal of said additional optical element and said altered beam path conjointly defining an acute angle.

3. The arrangement of claim 2, said second mirror means being disposed on said altered beam path downstream of said nonlinear element; said nonlinear element being a frequency converter for converting the frequency of said beam to a converted frequency which travels back along said altered beam path after being reflected at said second mirror means; and, beam path-folding means for receiving the beam having the converted frequency and deflecting the same into said axis of said beam having said fundamental frequency.

4. The arrangement of claim 2, said second mirror means being disposed on said altered beam path downstream of said nonlinear element; said nonlinear element being a frequency converter for converting the frequency of said beam to a converted frequency which travels back along said altered beam path after being reflected at said second mirror means; and, beam path-folding means for receiving the beam having the converted frequency and deflecting the same so as to travel along a second axis parallel to said axis of said beam having said fundamental frequency.

5. The arrangement of claim 2, said acute angles being less than 15°.

6. The arrangement of claim 2, said acute angles being less than 4°.

7. The laser arrangement of claim 1, said laser head being a continuous-wave laser.

8. The laser arrangement of claim 1, said laser head being a pulsed laser.

9. The laser arrangement of claim 1, said resonator comprising an acusto-optical modulator.

10. The laser arrangement of claim 1, said resonator comprising an electro-optical modulator.

* * * * *